United States Patent
Watanabe et al.

(10) Patent No.: US 8,797,234 B2
(45) Date of Patent: Aug. 5, 2014

(54) DISPLAY DEVICE INCLUDING LIGHT-TRANSMITTING COVER WITH LENS PORTION AND ELECTRONIC DEVICE INCLUDING SAME

(75) Inventors: Hisashi Watanabe, Osaka (JP); Satoshi Shibata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 586 days.

(21) Appl. No.: 13/000,687

(22) PCT Filed: Jun. 18, 2009

(86) PCT No.: PCT/JP2009/002786
§ 371 (c)(1),
(2), (4) Date: Dec. 22, 2010

(87) PCT Pub. No.: WO2009/157161
PCT Pub. Date: Dec. 30, 2009

(65) Prior Publication Data
US 2011/0102302 A1  May 5, 2011

(30) Foreign Application Priority Data

Jun. 26, 2008  (JP) .................. 2008-167828

(51) Int. Cl.
G09G 5/00 (2006.01)
G06F 1/16 (2006.01)
G02F 1/1333 (2006.01)
G09F 9/30 (2006.01)
G02F 1/1335 (2006.01)
G02B 3/02 (2006.01)

(52) U.S. Cl.
CPC .............. *G09F 9/30* (2013.01); *G06F 1/1624* (2013.01); *G02B 3/02* (2013.01); *G02F 1/13336* (2013.01); *G02F 2001/133388* (2013.01); *G06F 1/1641* (2013.01); *G02F 2001/133331* (2013.01); *G06F 1/1616* (2013.01); *G02F 1/133526* (2013.01); *G02F 1/133615* (2013.01); *G02F 1/133502* (2013.01)
USPC ........................................................ 345/1.3

(58) Field of Classification Search
USPC ........................................................ 345/1.3
See application file for complete search history.

(56) References Cited

U.S. PATENT DOCUMENTS 6,483,482 B1   11/2002   Kim
6,927,908 B2    8/2005   Stark (Continued)

FOREIGN PATENT DOCUMENTS

JP   08-184850 A   7/1996
JP   10-254378 A   9/1998

(Continued)

OTHER PUBLICATIONS

English translation of Official Communication issued in corresponding International Application PCT/JP2009/002786, mailed on Feb. 17, 2011.

(Continued)

*Primary Examiner* — Kwang-Su Yang
(74) *Attorney, Agent, or Firm* — Keating & Bennett, LLP

(57) ABSTRACT

A direct-viewing type display device according to the present invention includes: at least one display panel having a display region and a frame region provided outside the display region, with a boundary extending along the first direction between the display region and the frame region; and at least one light-transmitting cover disposed on a viewer's side of the at least one display panel. The at least one light-transmitting cover includes a lens portion disposed astride the boundary for refracting a portion of light going out from the display region toward the frame region; and a viewer-side surface of the lens portion is a curved surface, and a rear-side surface of the lens portion is also a curved surface.

24 Claims, 11 Drawing Sheets

(56) References Cited

U.S. PATENT DOCUMENTS

| | | | |
|---|---|---|---|
| 7,197,338 B2 | 3/2007 | Ozawa | |
| 7,777,811 B2 * | 8/2010 | Kondo | 348/383 |
| 8,508,433 B2 * | 8/2013 | Manning | 345/1.3 |
| 2002/0191131 A1 * | 12/2002 | Ota et al. | 349/110 |
| 2006/0007369 A1 | 1/2006 | Jin et al. | |
| 2006/0077544 A1 * | 4/2006 | Stark | 359/448 |
| 2007/0218411 A1 * | 9/2007 | Sakata | 430/313 |
| 2010/0238090 A1 * | 9/2010 | Pomerantz et al. | 345/1.3 |

FOREIGN PATENT DOCUMENTS

| | | | | | |
|---|---|---|---|---|---|
| JP | 2000-180964 A | 6/2000 | | | |
| JP | 2000-330482 A | 11/2000 | | | |
| JP | 2001-358807 A | 12/2001 | | | |
| JP | 2002-098941 A | 4/2002 | | | |
| JP | 2002-099226 A | 4/2002 | | | |
| JP | 2003-050554 A | 2/2003 | | | |
| JP | 2003-157031 A | 5/2003 | | | |
| JP | 2003157031 A | * | 5/2003 | | G09F 9/40 |
| JP | 2003-167240 A | 6/2003 | | | |
| WO | 02/01284 A1 | 1/2002 | | | |
| WO | 2008/149449 A1 | 12/2008 | | | |
| WO | 2009/066436 A1 | 5/2009 | | | |
| WO | 2009/157150 A1 | 12/2009 | | | |

OTHER PUBLICATIONS

Official Communication issued in International Patent Application No. PCT/JP2009/002786, mailed on Jul. 28, 2009.

Watanabe et al., "Display Device," U.S. Appl. No. 13/000,693, filed Dec. 22, 2010.

Watanabe et al., "Display Device," U.S. Appl. No. 12/743,882, filed May 20, 2010.

* cited by examiner

FIG.6
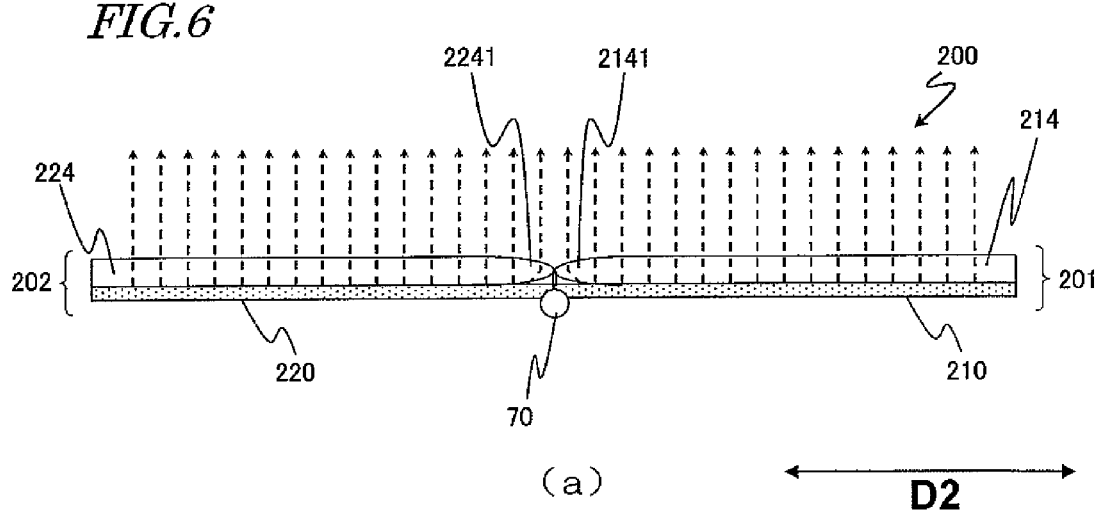
(a)
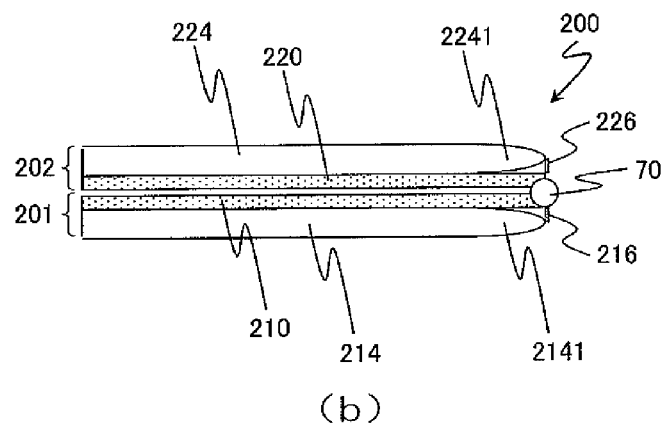
(b)
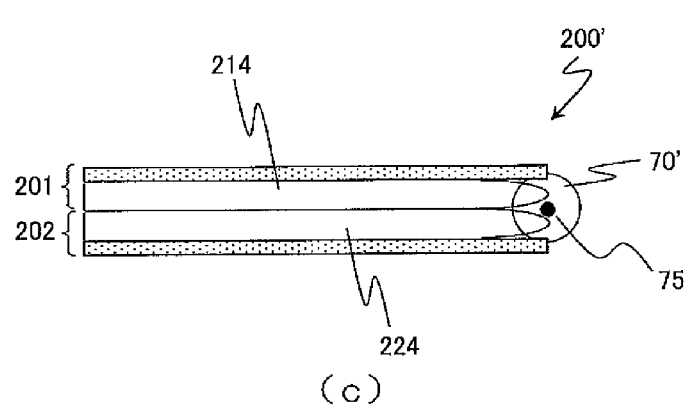
(c)

FIG.7
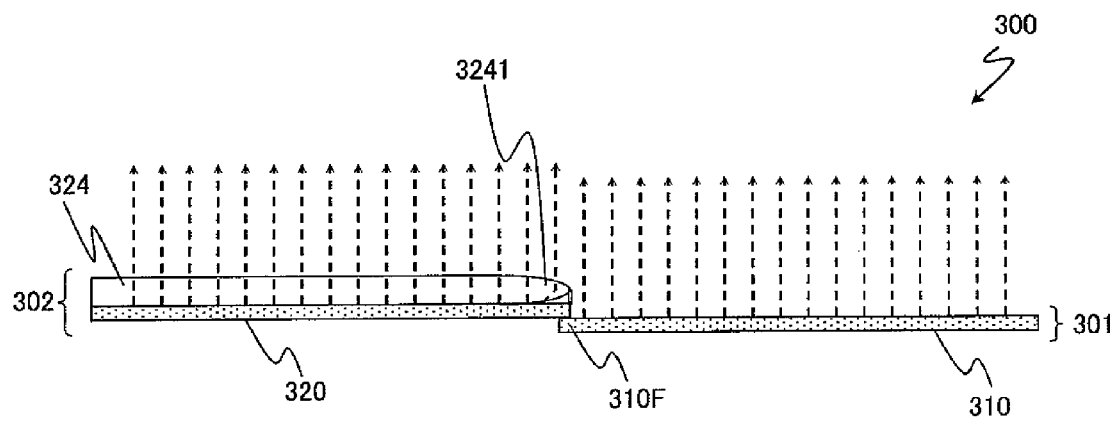
(a)
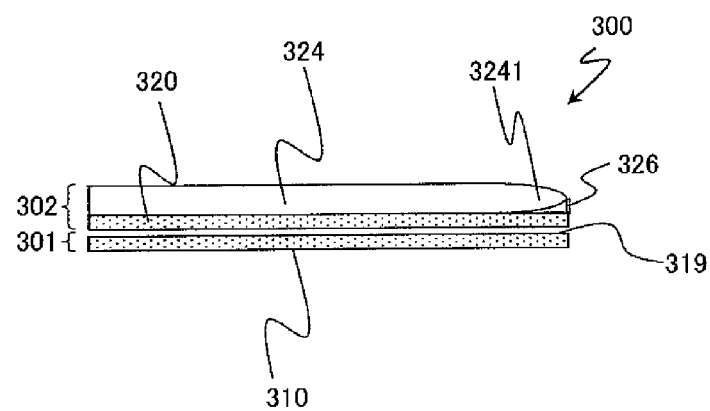
(b)

FIG.8
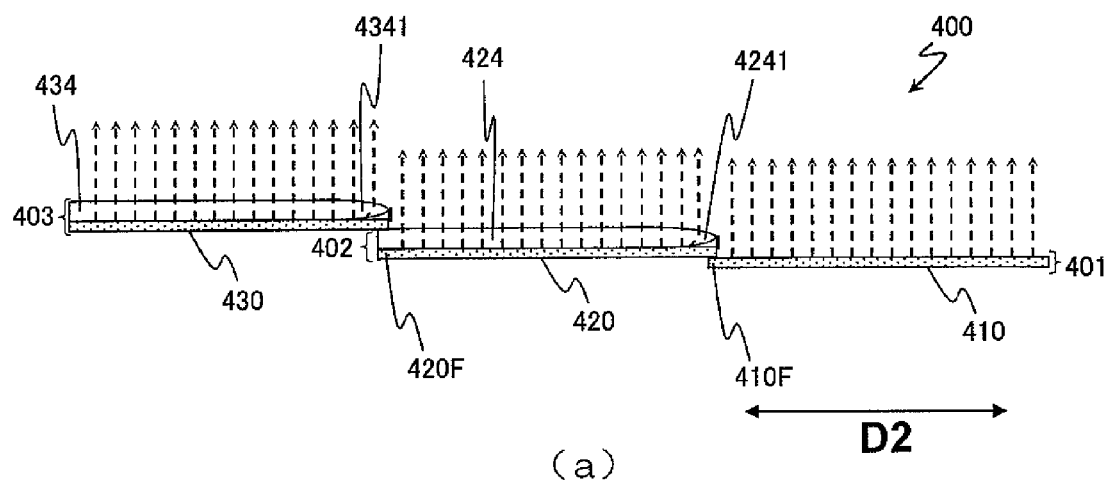
(a)
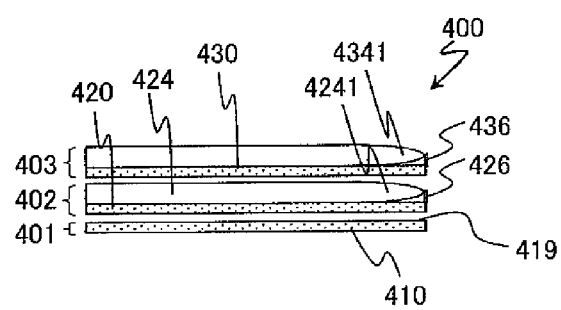
(b)

DISPLAY DEVICE INCLUDING LIGHT-TRANSMITTING COVER WITH LENS PORTION AND ELECTRONIC DEVICE INCLUDING SAME

TECHNICAL FIELD

The present invention relates to a display device, and more particularly to a direct-viewing type display device.

BACKGROUND ART

In recent years, in television sets and display devices for displaying information, attempts of arraying a plurality of display devices (which may be referred to as a tiling technique) are being made. By using this tiling technique, for example, attempts are made at realizing a pseudo large-screen display device. However, using this tiling technique has a problem of visible joints between the plurality of display devices.

This problem will be described by taking a liquid crystal display device for example.

A liquid crystal display device includes a liquid crystal display panel, a backlight device, circuits for supplying various electrical signals to the liquid crystal display panel, and a power supply, as well as a housing in which to accommodate these. The liquid crystal display panel includes a pair of glass substrates and a liquid crystal layer provided between them. On one of the pair of glass substrates, color filter layers and a counter electrode are formed, whereas on the other glass substrate, TFTs, bus lines, a driving circuit for supplying signals to them, and the like are provided. Moreover, the liquid crystal display panel has a display region in which a plurality of pixels are arrayed, and a frame region around it. In the frame region, a sealing portion for ensuring that the pair of substrates oppose each other and also sealing and retaining the liquid crystal layer, an implementation of driving circuitry for driving the pixels, and the like are provided.

Since no pixels are arrayed in the frame region, the frame region does not contribute to displaying. In other words, to a viewer of the liquid crystal display panel, the frame region is visually recognized as a portion where no image is displayed.

When constructing a large screen by arraying a plurality of liquid crystal display panels, no image is displayed in the frame region of each liquid crystal display panel since the frame region of the liquid crystal display panel does not contribute to displaying, so that joints will occur in the image. This problem is not limited to liquid crystal display devices, but is a problem common to direct-viewing type display devices, e.g., plasma display devices (PDPs), organic EL display devices, and electrophoresis display devices.

Patent Document 1 discloses a display device for displaying a jointless image.

The display device described in Patent Document 1 includes a light-transmitting cover on the viewer's side of the display panel. An edge portion of the light-transmitting cover has a portion where its surface on the viewer's side is curved. The curved portion functions as a lens, and therefore will be referred to as a "lens portion" hereinafter. The lens portion of the light-transmitting cover is provided so as to overlap the frame region of the display panel and a portion of a region of the display region adjoining the frame region. A portion of the display region that overlaps the lens portion will be referred to as a "peripheral display region". Light which goes out from pixels which are arrayed in the peripheral display region is refracted by the lens portion toward the frame region. As a result, an image is also displayed on the front face of the frame region, so that a jointless image is displayed on the entire screen.

CITATION LIST

Patent Literature

[Patent Document 1] Japanese National Phase PCT Laid-Open Publication No. 2004-524551

SUMMARY OF INVENTION

Technical Problem

However, as disclosed in Patent Document 1, adopting a construction where a lens portion having a curved viewer-side surface is provided in an edge portion of the light-transmitting cover has the following problems. These problems will be described with reference to FIG. 11 and FIG. 12.

FIG. 11 and FIG. 12 show results of ray-tracing simulations for lens portions of display devices 800 and 900 having a light-transmitting cover described in Patent Document 1. The display device 800 shown in FIG. 11 and the display device 900 shown in FIG. 12 differ in the structure of their light-transmitting covers.

The display device 800 shown in FIG. 11 includes display panels 810 and 820, and light-transmitting covers 814 and 824, which are disposed on the viewer's side of the display panels 810 and 820 (an upper side in FIG. 11). Edge portions of the light-transmitting covers 814 and 824 include lens portions 8141 and 8241. The viewer-side surfaces of the lens portions 8141 and 8241 are curved surfaces with a circular arc cross section. Similarly to the display device 800, the display device 900 shown in FIG. 12 includes display panels 910 and 920 and light-transmitting covers 914 and 924, and the light-transmitting covers 914 and 924 have lens portions 9141 and 9241 whose viewer-side surfaces are curved surfaces. The radii of curvature of the lens portions 8141 and 8241 of the display device 800 are relatively small, and the thicknesses h81 and h82 of the light-transmitting covers 814 and 824 are relatively small. On the other hand, the lens portions 9141 and 9241 of the display device 900 have relatively large radius of curvature, and the thicknesses h91 and h92 of the light-transmitting covers 914 and 924 are relatively large. Herein, it is assumed that the frame regions 810F, 820F, 910F, and 920F of the display panels 810, 820, 910, and 920 all have an equal width L2, and that a non-display region 830 of the display device 800 and a non-display region 930 of the display device 900 are each composed only of the frame regions.

In the display device 800, light going out from the pixels in the peripheral display regions 810D and 820D is refracted by the lens portions 8141 and 8241 onto the non-display region 830 located at a boundary between the display panels 810 and 820, whereby a jointless image is displayed. In the display device 900, as in the display device 800, light going out from the pixels in the peripheral display regions 910D and 920D are refracted by the lens portions 9141 and 9241 onto the non-display region 930 located at a boundary between the display panels 910 and 920, whereby a jointless image is displayed.

Now, the width of a lens portion is represented as a sum of a width L1 of the peripheral display region and a width L2 of the frame region, and an image compression rate is defined as $a=L1/(L1+L2)(0<a<1)$. Accordingly, when an image in the peripheral display region is enlarged by a factor of $1/a$, which is an inverse of the image compression rate $a$, an image which is free of joints and distortion will be displayed. In other words, the image compression rate represents a compression rate which must be used when previously compressing an image to be formed in the peripheral display region of the display panel so that an image free of distortion will be displayed when the image formed in the peripheral display region is enlarged by the lens portion. Patent Document 1 describes a construction which compensates for distortion by applying compression to the pixels of an edge portion.

While the width L2 of the frame region is constant, the image compression rate a can be varied by changing the width L1 of the peripheral display region. If the L1 is decreased, the image compression rate a becomes smaller. Conversely, if L1 is increased, the image compression rate a becomes larger. The display device 800 (FIG. 11) represents a case where the image compression rate a is relatively small (e.g. a<0.7), whereas the display device 900 (FIG. 12) represents a case where the image compression rate a is relatively large.

In the display device 800, the image compression rate a is small and the enlargement rate 1/a is large, so that the curved surfaces of the lens portions 8141 and 8241 on the viewer's side have a small radius of curvature, and the light-transmitting covers 814 and 824 are thin. On the other hand, in the display device 900, the image compression rate a is large and the enlargement rate 1/a is small, so that the lens portions 9141 and 9241 have a large radius of curvature, and the light-transmitting covers 914 and 924 are thick.

Herein, as in the display device 800 shown in FIG. 11, when the image compression rate a is small (e.g. a<0.7), the black matrix between pixels may become conspicuous because the pixel enlargement rate is large. Moreover, since an image which is formed in the peripheral display regions is enlarged by the lens portions 8141 and 8241, the resolution will be lowered according to the enlargement rate (1/a). At this time, a difference in resolution occurs between the image which is displayed on the lens portions 8141 and 8241 and the image which is displayed on flat plate portions 8142 and 8242. When the enlargement rate is relatively large, the decrease in resolution of the image which is displayed on the lens portions 8141 and 8241 is large, so that its difference in resolution from the image which is displayed on the flat plate portions 8142 and 8242 will become large.

On the other hand, in the display device 900, the image compression rate a is large and the enlargement rate 1/a is small, and therefore the black matrix is not conspicuous, and the decrease in the resolution of the image which is displayed on the lens portions 9141 and 9241 is small. Therefore, the display device 900 has a higher display quality than that of the display device 800.

It can be seen from the above description that, when the technique disclosed in Patent Document 1 is adopted, in order to obtain a high display quality, the image compression rate a may be increased and a thick light-transmitting cover may be employed as in the display device 900. However, there is a problem in that a thick light-transmitting cover increases the thickness and weight of the display device. In particular, it makes applications to display devices such as portable electronic devices difficult.

While the above description illustrates problems of the conventional techniques with respect to a display device which is tiled with a plurality of display panels, similar problems will also occur when using a light-transmitting cover in order to obscure the frame region of a single display panel.

The present invention has been made in order to solve the above problems, and an objective thereof is to provide a direct-viewing type display device in which a frame region of a display panel is obscured, or which can display a jointless image in the case of being tiled with a plurality of display panels, the direct-viewing type display device having a high display quality and being thinner or lighter than conventionally.

Solution to Problem

A direct-viewing type display device according to the present invention comprises: at least one display panel having a display region and a frame region provided outside the display region, with a boundary extending along a first direction between the display region and the frame region; and at least one light-transmitting cover disposed on a viewer's side of the at least one display panel, wherein, the at least one light-transmitting cover includes a lens portion disposed astride the boundary for refracting a portion of light going out from the display region toward the frame region; and a viewer-side surface of the lens portion is a curved surface, and a rear-side surface of the lens portion is also a curved surface.

In one embodiment, the viewer-side surface of the lens portion and the rear-side surface of the lens portion are symmetric in shape.

In one embodiment, at least one of a first line of intersection and a second line of intersection is a circular arc, the first line of intersection being a line of intersection between the viewer-side surface of the lens portion and a plane which is perpendicular to the boundary, and the second line of intersection being a line of intersection between the rear-side surface of the lens portion and the plane which is perpendicular to the boundary.

In one embodiment, at least one of a first line of intersection and a second line of intersection is a curve other than a circular arc, the first line of intersection being a line of intersection between the viewer-side surface of the lens portion and a plane which is perpendicular to the boundary, and the second line of intersection being a line of intersection between the rear-side surface of the lens portion and the plane which is perpendicular to the boundary.

In one embodiment, at least one of the viewer-side surface of the lens portion and the rear-side surface of the lens portion is a free curved surface.

In one embodiment, the at least one light-transmitting cover includes, in a portion other than the lens portion, a flat plate portion whose viewer-side surface is composed of a face which is substantially parallel to a display plane of the at least one display panel.

In one embodiment, in the display region, a plurality of pixels are arrayed at an equal interval along the first direction and along a second direction which is perpendicular to the first direction.

In one embodiment, a display signal supplied to a pixel emitting light entering the lens portion is compressed along the second direction relative to a display signal supplied to a pixel emitting light entering the flat plate portion.

In one embodiment, a display signal supplied to a pixel emitting light entering the lens portion is uniformly compressed along the second direction at a compression rate a (0<a<1) relative to a display signal supplied to a pixel emitting light entering the flat plate portion; and the compression rate a is defined by the equation $a = L1/(L1+L2)$, where $L1$ is a width of a peripheral display region along the second direction, the peripheral display region being a region of the display region in which pixels emitting light entering the lens portion are arrayed; and $L2$ is a width of the frame region along the second direction.

In one embodiment, the lens portion enlarges an image created in the peripheral display region uniformly by a factor of 1/a along the second direction.

In one embodiment, the compression rate a is 0.7 or more.

In one embodiment, a luminance of an image created in the peripheral display region is higher than a luminance of an image created in a region of the display region other than the peripheral display region.

In one embodiment, the display device according to the present invention further comprises a backlight device for emitting light toward the at least one display panel, wherein, an intensity of light emitted from the backlight device toward pixels arrayed in the peripheral display region is higher than an intensity of light emitted from the backlight device toward pixels arrayed in a region of the display region other than the peripheral display region.

In one embodiment, a protection member is provided at an end of the lens portion closer to the frame region.

In one embodiment, the protection member is an adhesion film.

In one embodiment, the protection member has an optical absorption rate of 95% or more.

In one embodiment, the protection member is black in color.

In one embodiment, a viewer's side of the at least one light-transmitting cover is antireflection-treated.

In one embodiment, a layer having a lower refractive index than that of the at least one light-transmitting cover is provided on a viewer's side of the at least one light-transmitting cover.

In one embodiment, the at least one light-transmitting cover is adhesively bonded to the at least one display panel with a resin having a lower refractive index than that of the at least one light-transmitting cover.

In one embodiment, a second boundary extends along a second direction between the display region and the frame region, the second direction being perpendicular to the first direction; and the at least one light-transmitting cover includes a second lens portion disposed astride the second boundary.

In one embodiment, the at least one display panel includes two or more display panels arrayed so as to adjoin each other along the first direction or a second direction which is perpendicular to the first direction; the at least one light-transmitting cover includes two or more light-transmitting covers arrayed so as to adjoin each other along the first direction or the second direction; and lens portions of the two or more light-transmitting covers adjoin each other along the first direction or the second direction.

An electronic device according to the present invention comprises a first display section, a hinge, and a second display section connected to the first display section via the hinge, wherein, the first display section and the second display section are display devices of the above construction; and the hinge allows the electronic device to take: an open state in which the first display section and the second display section lie side by side so that the lens portion of the first display section and the lens portion of the second display section adjoin each other; or a closed state in which the first display section is in overlying relation with the second display section.

Alternatively, an electronic device according to the present invention comprises: a first display section having a display region and a frame region provided outside the display region; and a second display section having a display device of the above construction and being disposed on a viewer's side of the first display section, wherein the second display section is retained by the first display section so that, as seen from the viewer's side, the second display section is capable of sliding between: a position at which the second display section overlies the first display section; and a position at which the second display section and the first display section adjoin each other and the lens portion of the second display section overlaps the frame region of the first display section.

An electronic device according to an embodiment comprises a third display section having a display device of the above construction and being disposed on a viewer's side of the second display section, wherein the third display section is retained by the second display section so that, as seen from the viewer's side, the third display section is capable of sliding between: a position at which the third display section overlies the second display section; and a position at which the third display section and the second display section adjoin each other and the lens portion of the third display section overlaps the frame region of the second display section.

Advantageous Effects of Invention

According to the present invention, there is provided a direct-viewing type display device in which a frame region of a display panel is obscured, or which can display a jointless image in the case of being tiled with a plurality of display panels, the direct-viewing type display device having a high display quality and being suitable for thinness and lightweightness.

BRIEF DESCRIPTION OF DRAWINGS

FIG. 6 (a) and (b) are diagrams showing an electronic device 200 according to an embodiment of the present invention, and (c) is a diagram showing an electronic device 200', where (a) shows an open state; and (b) and (c) show a closed state.

FIG. 7 A diagram showing an electronic device 300 according to an embodiment of the present invention, where (a) shows a case where a display section 301 and a display section 302 lie side by side; and (b) shows a case where the display section 302 overlies the display section 301.

FIG. 8 A diagram showing an electronic device 400 according to an embodiment of the present invention, where (a) shows a case where a display section 401, a display section 402, and a display section 403 lie side by side; and (b) shows a case where the display section 401, the display section 402, and the display section 403 overlie one another.

DESCRIPTION OF EMBODIMENTS

Hereinafter, embodiments of the present invention will be described with reference to the drawings. However, the present invention is not limited to the illustrated embodiments.

Figure 1:
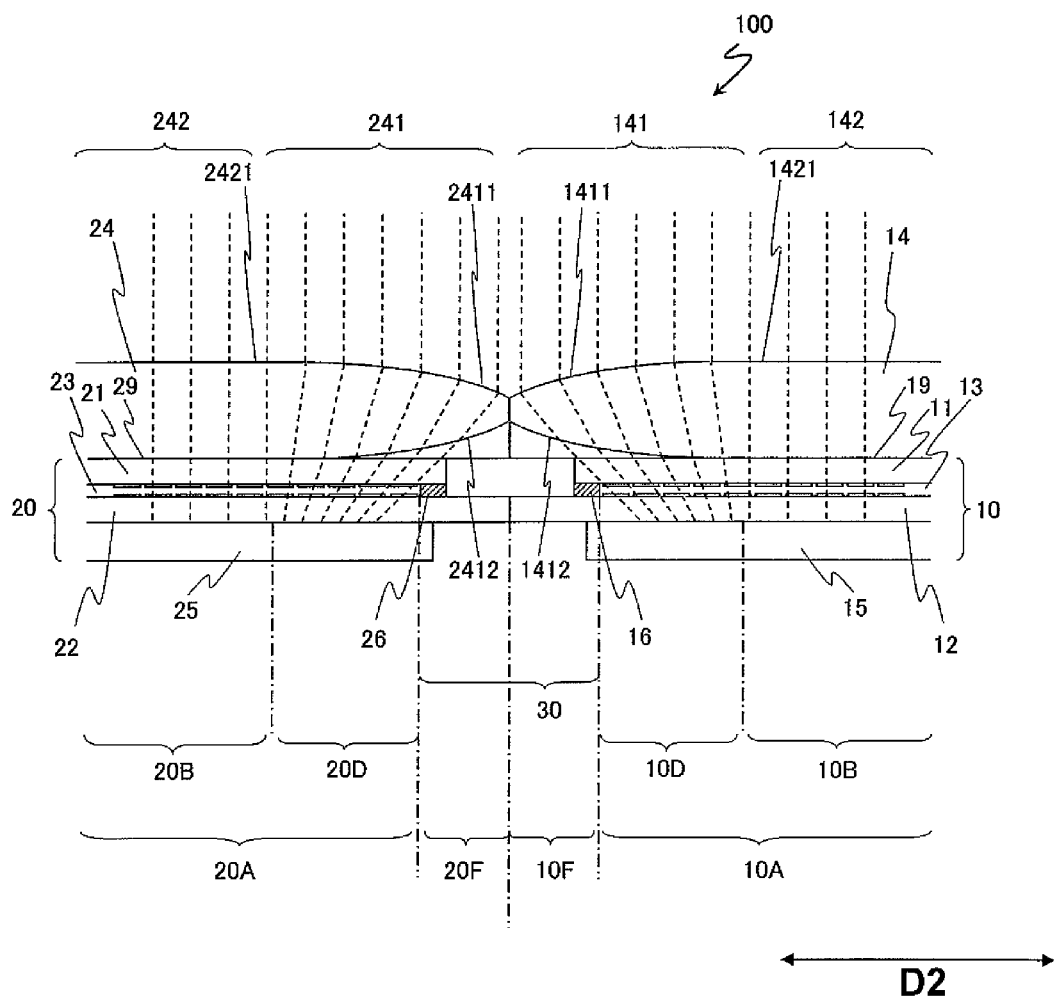
FIG. 1 A schematic cross-sectional view of a display device 100 according to an embodiment of the present invention.

FIG. 1 schematically shows a direct-viewing type liquid crystal display device 100 according to an embodiment of the present invention. FIG. 1 is a schematic cross-sectional view of the liquid crystal display device 100. Although a liquid crystal display device which includes a liquid crystal display panel as a display panel will be illustrated below, a display panel to be used for the display device according to the present invention is not limited thereto. As the display panel, a display panel for a PDP, an organic EL display panel, an electrophoresis display panel, or the like can also be used, for example.

Figure 2:
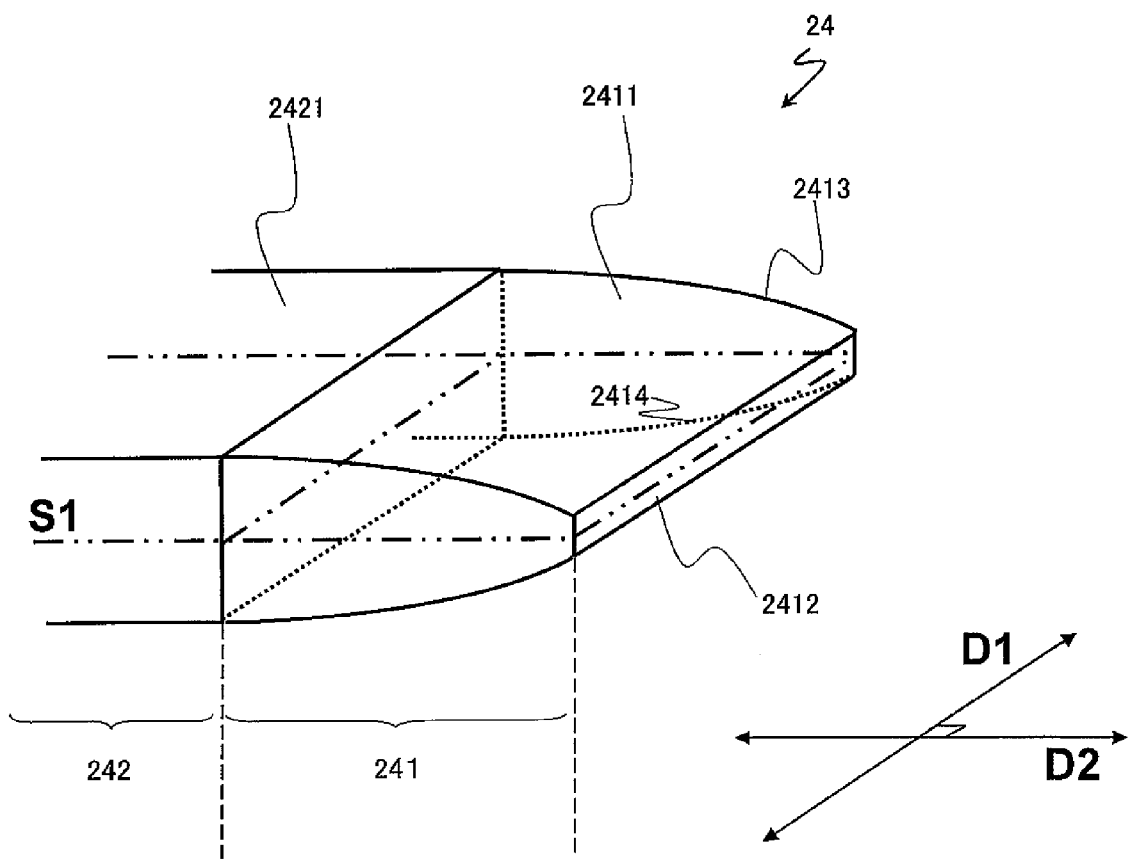
FIG. 2 A schematic perspective view of a light-transmitting cover 24.

The liquid crystal display device 100 shown in FIG. 1 includes two liquid crystal display panels 10 and 20, with light-transmitting covers 14 and 24 being disposed on the viewer's side (an upper side in FIG. 1) of the liquid crystal display panels 10 and 20. Herein, a liquid crystal display device is illustrated in which the liquid crystal display panels 10 and 20 are disposed so as to adjoin each other. Instead of the liquid crystal display panels 10 and 20, it is possible to use a liquid crystal displaying unit which is composed of a liquid crystal display panel 10 accommodated in a housing and a liquid crystal displaying unit which is composed of a liquid crystal display panel 20 accommodated in a housing, such that the liquid crystal displaying units are disposed so as to adjoin each other. The construction of the light-transmitting covers 14 and 24 will be described in detail later with reference to FIG. 2. Note that FIG. 2 is a perspective view of the light-transmitting cover 24.

The liquid crystal display panels 10 and 20 include: display regions 10A and 20A in which a plurality of pixels are arrayed; and frame regions 10F and 20F lying outside the display regions 10A and 20A. Any region not contributive to displaying will be collectively referred to as a non-display region 30. The non-display region 30 includes the frame regions 10F and 20F, and if any gap or connecting portion exists therebetween, such a gap or connecting portion also belongs in the non-display region 30. In the liquid crystal display device 100 of the present embodiment, it is assumed that the non-display region 30 is composed only of the frame regions 10F and 20F. In the display region 10A of the liquid crystal display panel 10, a plurality of pixels are placed in a matrix along a first direction, which is the direction of a border line between the display region 10A and the frame region 10F (a normal direction of display planes 19 and 29 of the liquid crystal display panels 10 and 20, indicated as D1 in FIG. 2), and a second direction D2, which is perpendicular to the first direction and parallel to the display plane 19 of the liquid crystal display panel 10 (a horizontal direction of the display planes 19 and 29 of the liquid crystal display panels 10 and 20). In the liquid crystal display panel 20, too, a plurality of pixels are arranged in a matrix array along the first direction and the second direction in the display region 20A. In the display regions 10A and 20A, the pixels are arrayed at an equal pitch along each of the first direction and the second direction.

The liquid crystal display panel 10 includes a light-transmitting upper substrate 11 and a lower substrate 12, with a liquid crystal layer 13 being provided between the upper substrate 11 and the lower substrate 12. A color filter layer and a counter electrode are formed on the upper substrate 11, for example. On the lower substrate 12, transparent electrodes are formed in a matrix shape, for example, and also, TFTs, bus lines, driving circuits for supplying signals thereto, and the like are provided. Polarizers are respectively disposed above the upper substrate 11 and below the lower substrate 12 (although the polarizers are not shown). Included in the frame region 10F of the liquid crystal display panel 10 are a sealing portion 16 for allowing the liquid crystal layer 13 to be retained between the upper substrate 11 and the lower substrate 12, driving circuitry for driving the pixels, and the like. A backlight device 15 is provided further below the polarizer which is disposed below the lower substrate 12. In the liquid crystal display panel 20, an upper substrate 21, a lower substrate 22, a liquid crystal layer 23, a polarizer, a sealing portion 26, a backlight device 25, and the like are provided, as in the liquid crystal display panel 10. As the backlight devices 15 and 25, those which are called the edgelight type are used herein, which perform lighting through diffused emission via a light guide plate, by using a fluorescent lamp as a light source.

As mentioned earlier, the light-transmitting covers 14 and 24 are disposed on the viewer's side of the liquid crystal display panels 10 and 20. The light-transmitting covers 14 and 24 include lens portions 141 and 241 and flat plate portions 142 and 242. The lens portions 141 and 241 are provided at edge portions of the light-transmitting covers 14 and 24, whereas the flat plate portions 142 and 242 are provided in portions of the light-transmitting covers 14 and 24 other than the lens portions 141 and 241. The lens portions 141 and 241 and the flat plate portions 142 and 242 differ from each other in terms of the shape of their viewer-side surfaces.

The lens portion 141 is disposed astride the boundary extending along the first direction between the display region 10A and the frame region 10F of the liquid crystal display panel 10. Stated otherwise, the lens portion 141 is on the viewer's side of a region including the frame region 10F and a peripheral display region 10D, the peripheral display region 10D being a region of the display region 10A that adjoins the frame region 10F along the second direction. Similarly, the lens portion 241 is disposed astride the boundary extending along the first direction between the display region 20A and the frame region 20F, and is on the viewer's side of a region including the frame region 20F and a peripheral display region 20D.

FIG. 2 shows a perspective view of the light-transmitting cover 24 of the liquid crystal display device 100 of the present embodiment. A viewer-side (upper side in FIG. 2) surface 2411 and a rear-side (lower side in FIG. 2) surface 2412 of the lens portion 241 are both curved surfaces. In the present embodiment, the shape of the viewer-side surface 2411 and the shape of the rear-side surface 2412 are curved surfaces that are symmetric with respect to a plane (plane S1 in FIG. 2) which divides the lens portion 241 into upper and lower halves; however, similar effects to those under the present embodiment can also be obtained even if they are not symmetric. Note that, rather than designing the shape of the viewer-side surface 2411 and the shape of the rear-side surface 2412 of the lens portion 241 to be curved surfaces that are symmetric with respect to plane S1, the radius of curvature of the viewer-side surface 2411 may be increased so as to result in a shape which is close to a plane; as a result, the display plane will seem like a plane when viewed from the viewer, possibly improving the appearance of the display device.

Moreover, in the present embodiment, a line of intersection (first line of intersection) 2413 between the viewer-side surface 2411 and a plane which is perpendicular to the first direction (D1) and a line of intersection (second line of intersection) 2414 between the rear-side surface 2412 and the plane which is perpendicular to the first direction are both illustrated as circular arcs, but they may be curves that are not circular arcs. For example, the first line of intersection 2413 and the second line of intersection 2414 may be curves that are defined by an aspherical function. The first line of intersection 2413 and the second line of intersection 2414 may be different curves from each other. Moreover, at least one of the viewer-side surface 2411 and the rear-side surface 2412 may be a free curved surface.

Note that the lens portion 141 of the light-transmitting cover 14 disposed on the liquid crystal display panel 10 is symmetric in shape to the lens portion 241 shown in FIG. 2, with respect to the border line between the liquid crystal display panels 10 and 20. In other words, the lens portion 141 is symmetric to the lens portion 241 with respect to a plane on which the lens portion 141 abuts the lens portion 241.

The lens portions 141 and 241 have ridges extending along the first direction. By ensuring that the direction in which the ridges extend is substantially perpendicular to the pixel columns, i.e., the color filter columns of the liquid crystal display panels 10 and 20, moiré can be prevented.

The flat plate portions 142 and 242 are on the viewer's side of central display regions 10B and 20B, which are regions of the display regions 10A and 20A other than the peripheral display regions 10D and 20D. Viewer-side surfaces 1421 and 2421 of the flat plate portions 142 and 242 are substantially parallel to the display planes 19 and 29 of the liquid crystal display panels 10 and 20.

Figure 3:
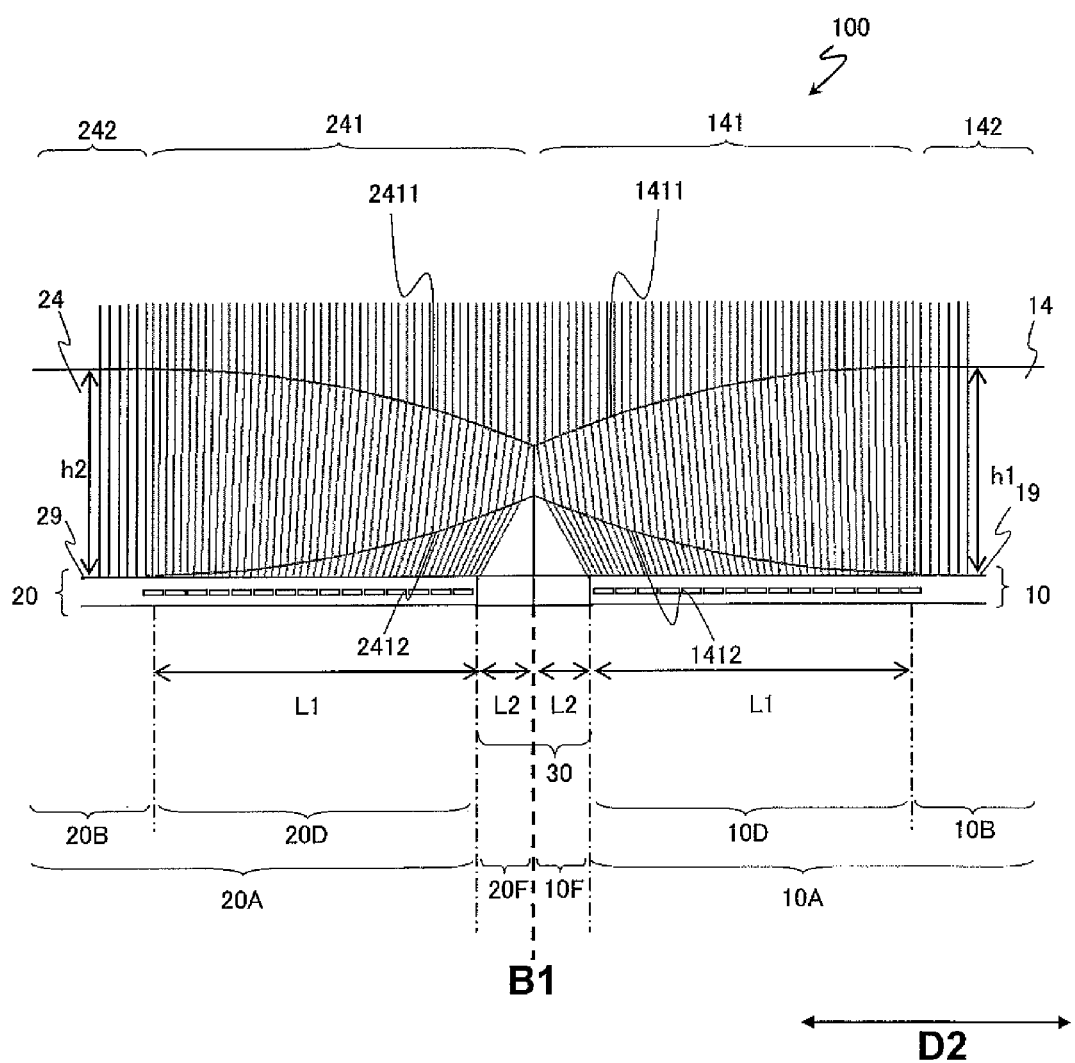
FIG. 3 A diagram showing a result of a ray-tracing simulation for a display device 100 of the present embodiment.

Next, with reference to FIG. 3, displaying of an image by the liquid crystal display device of the present embodiment will be described. FIG. 3 shows a result of a ray-tracing simulation, in the liquid crystal display device 100 of the present embodiment, for light which goes out from the liquid crystal display panels 10 and 20 and is transmitted through the light-transmitting covers 14 and 24. Note that the liquid crystal display device 100 shown in FIG. 3 has the same construction as the liquid crystal display device 100 described with reference to FIG. 1.

As shown in FIG. 3, light which goes out from pixels which are arrayed in the central display regions 10B and 20B of the liquid crystal display panels 10 and 20 strikes the flat plate portions 142 and 242, goes straight through the flat plate portions 142 and 242 in a direction which is perpendicular to the display planes 19 and 29 of the liquid crystal display panels 10 and 20 so as to go out on the viewer's side (an upper side in FIG. 3), and travels in a direction which is perpendicular to the display planes 19 and 29. Light which goes out from pixels which are arrayed in the peripheral display regions 10D and 20D strikes the lens portions 141 and 241, and is refracted outside (toward a border line B1 between the liquid crystal display panel 10 and the liquid crystal display panel 20) so as to go out on the viewer's side, and travels in a direction which is perpendicular to the display planes 19 and 29. In this manner, as the light emitted from the peripheral display regions 10D and 20D of the liquid crystal display panels 10 and 20 is refracted, an image is displayed on the front faces of the frame regions 10F and 20F. As a result, the frame regions 10F and 20F are obscured. This prevents the non-display region 30, which might have appeared as a joint in the image in the case of tiling, from being visually recognized, and makes it possible to display a jointless image even when display panels are used for tiling as in the display device of the present embodiment.

The viewer-side surfaces 1411 and 2411 and rear-side surfaces 1412 and 2412 of the lens portions 141 and 241 in the present embodiment are all curved surfaces, so that light entering the lens portions 141 and 241 is refracted twice. In the case where both front and rear faces of a lens portion are curved surfaces, light can be refracted to a greater extent, over a shorter optical distance, as compared to the case where only one face is a curved surface.

Figure 11:
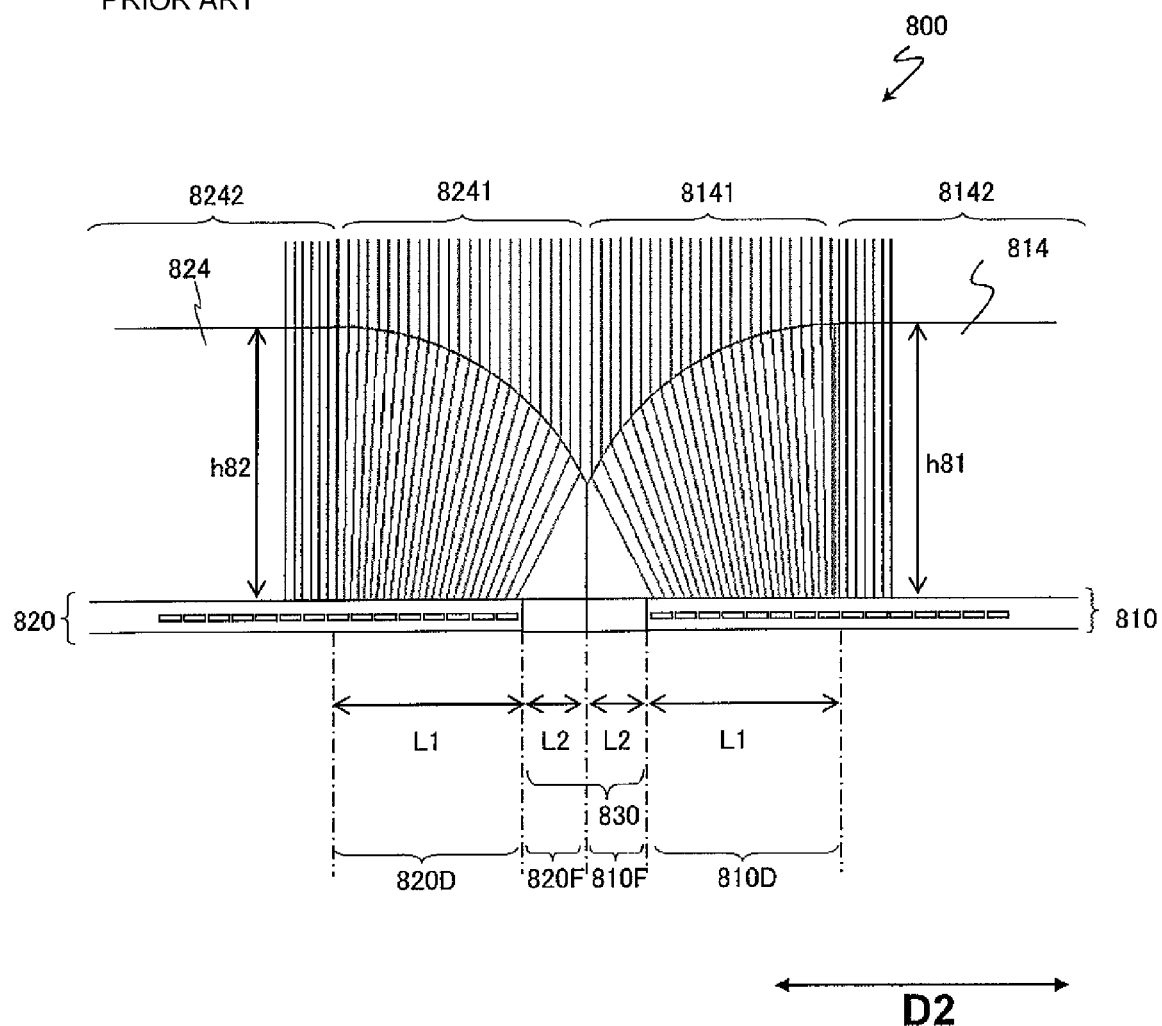
FIG. 11 A diagram showing a result of a ray-tracing simulation for a display device 800.
Figure 12:
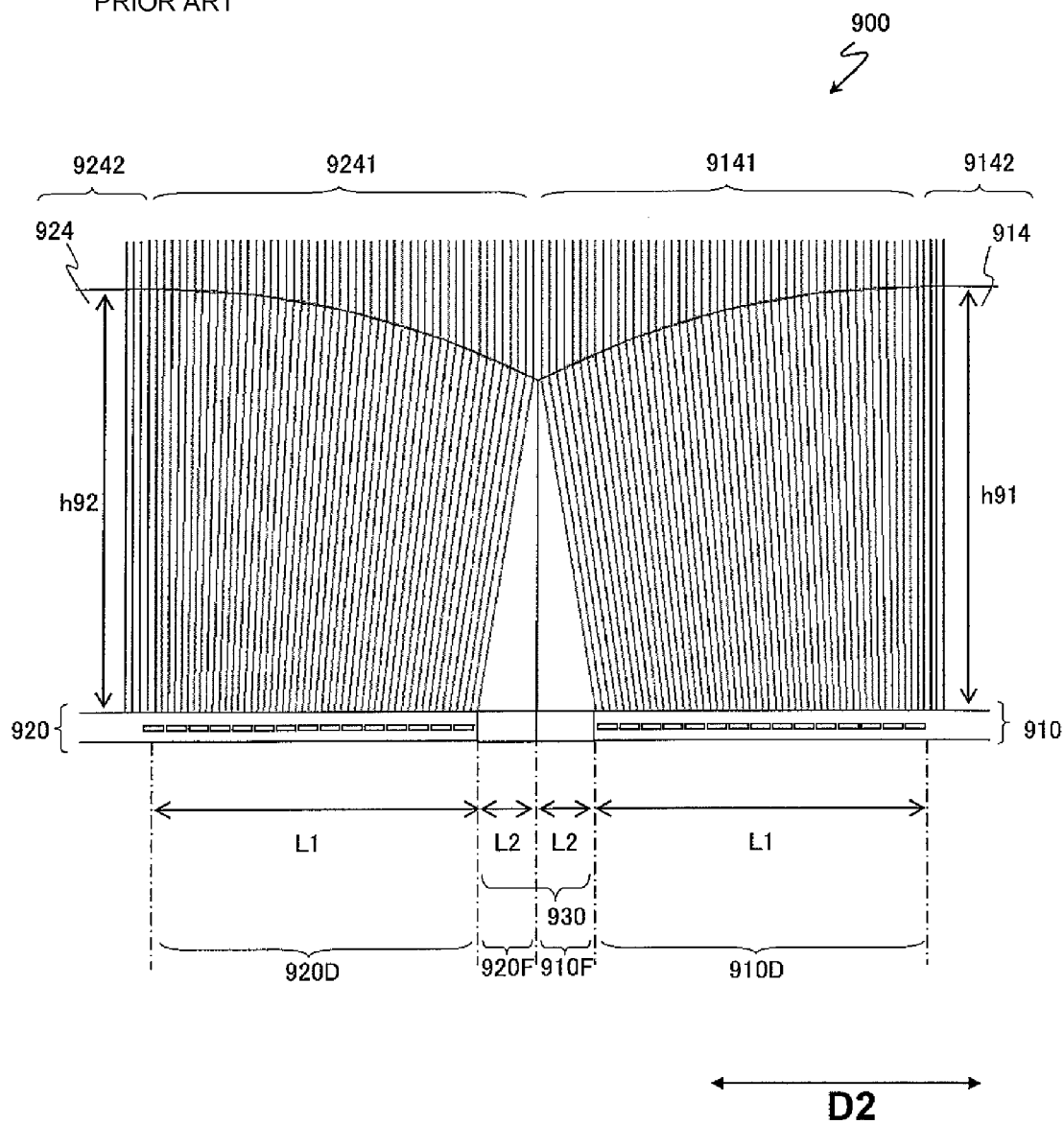
FIG. 12 A diagram showing a result of a ray-tracing simulation for a display device 900.

In the liquid crystal display device 100 of the present embodiment, as described above, both front and rear faces of the lens portions 141 and 241 are curved surfaces, so that light entering the lens portions 141 and 241 is refracted twice. Therefore, as compared to the curved surface described with reference to FIGS. 11 and 12, which is provided only on one surface of each light-transmitting cover, the curved surfaces of the lens portions 141 and 241 of the liquid crystal display device 100 are able to exhibit similar lens characteristics (enlargement rate) in spite of a greater radius of curvature. As a result, the thickness of each light-transmitting cover can be reduced as compared to a light-transmitting cover having a curved surface provided only on one surface thereof. The construction of the present embodiment is particularly advantageous in the case where the image compression rate a is large (e.g., 0.7 or more), and can provide a liquid crystal display device having a high display quality with a reduced decrease in resolution, by using light-transmitting covers which are thinner or lighter than conventional light-transmitting covers.

Exemplary design values for the liquid crystal display device 100 of the present embodiment are shown below.
width L2 of frame region 10F, 20F: 2 mm
thickness h1, h2 of light-transmitting cover 14, 24: 6 mm
radius of curvature of lens portion 141, 241: 33 mm
width of lens portion 141, 241 (=L1+L2): 13 mm
image compression rate a (=L1/(L1+L2)): 0.85

The resultant liquid crystal display device 100 had an image compression rate a>0.7, so that the black matrix between pixels was not conspicuous in the image displayed on the lens portions 141 and 241. Moreover, the image displayed on the lens portions 141 and 241 was not inferior in resolution to the image displayed on the flat plate portions 142 and 242, and there was little difference between the resolution of the image displayed on the lens portions 141 and 241 and the resolution of the image displayed on the flat plate portions 142 and 242.

Next, Comparative Examples 1 and 2 will be described.

Comparative Example 1

Figure 4:
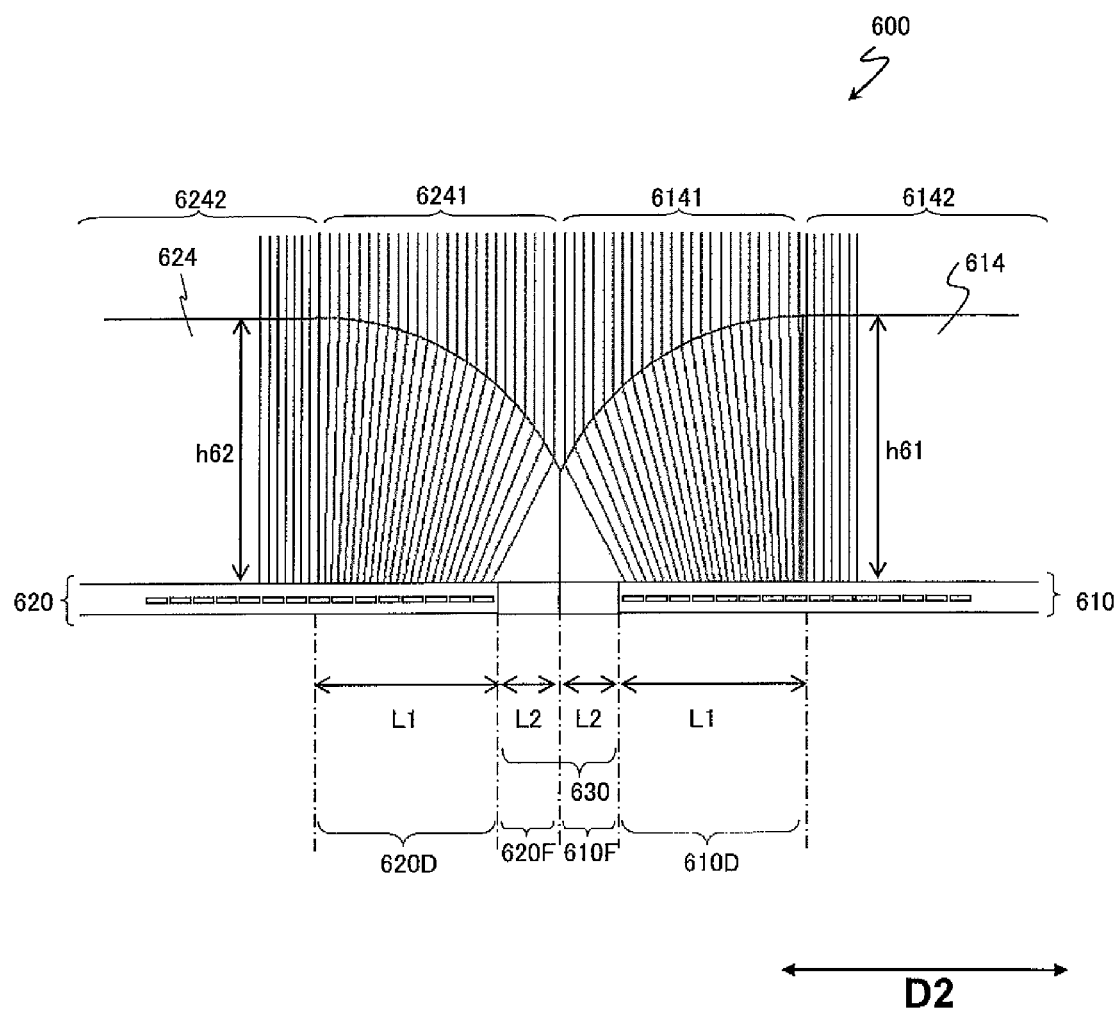
FIG. 4 A diagram showing a result of a ray-tracing simulation for a display device 600 according to Comparative Example 1.

FIG. 4 shows a result of a ray-tracing simulation for a display device 600 according to Comparative Example 1. The display device 600 includes display panels 610 and 620, with light-transmitting covers 614 and 624 being disposed on the viewer's side (an upper side in FIG. 4) of the display panels 610 and 620. The display device 600 of Comparative Example 1 is a display device in which only the viewer-side surfaces of the lens portions 6141 and 6241 are curved surfaces, such that the lens portions 6141 and 6241 have a relatively small radius of curvature and the light-transmitting covers 614 and 624 are relatively thin. Otherwise, it was identical in construction to the display device 100 of the present embodiment.

Design values for the display device 600 of Comparative Example 1 are shown below.
width L2 of frame region 610F, 620F: 2 mm
thickness h61, h62 of light-transmitting cover 614, 624: 6 mm
radius of curvature of lens portion 6141, 6241: 6 mm
width of lens portion 6141, 6241 (=L1+L2): 5 mm
image compression rate a (=L1/(L1+L2)): 0.6

Comparative Example 2

Figure 5:
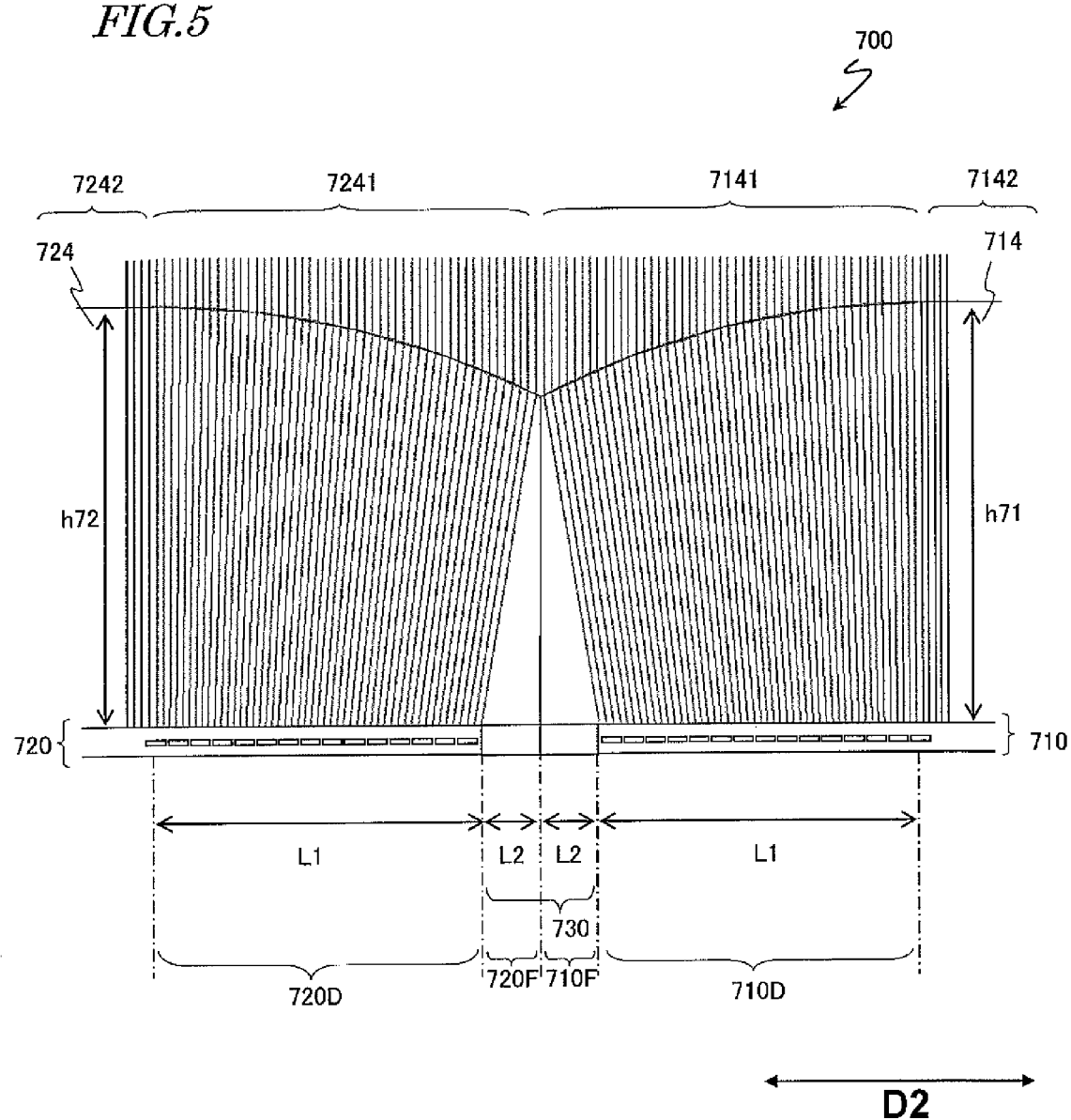
FIG. 5 A diagram showing a result of a ray-tracing simulation for a display device 700 according to Comparative Example 2.

FIG. 5 shows a result of a ray-tracing simulation for a display device 700 according to Comparative Example 2. The display device 700 includes display panels 710 and 720, with light-transmitting covers 714 and 724 being disposed on the viewer's side (an upper side in FIG. 5) of the display panels 710 and 720. The display device 700 of Comparative Example 2 is a display device in which only the viewer-side surfaces of the lens portions 7141 and 7241 are curved surfaces, such that the lens portions 7141 and 7241 have a relatively large radius of curvature and the light-transmitting covers 714 and 724 are relatively thick. Otherwise, it was identical in construction to the display device 100 of the present embodiment.

Design values for the display device 700 of Comparative Example 2 are shown below.

width L2 of frame region 710F, 720F: 2 mm
thickness h71, h72 of light-transmitting cover 714, 724: 11 mm
radius of curvature of lens portion 7141, 7241: 15 mm
width of lens portions 7141 and 7241 (=L1+L2): 13 mm
image compression rate a (=L1/(L1+L2)): 0.85

Table 1 is a table of performance comparison between the display device 100 of the present embodiment, the display device 600 of Comparative Example 1, and the display device 700 of Comparative Example 2. Table 1 comparatively shows jointless image displaying, display quality, and light-transmitting cover thickness. A ○ or X indication is given depending on whether jointless displaying is achieved or not, whether the display quality is high or low, and thickness of the light-transmitting covers.

TABLE 1

|  | jointless displaying | display quality | light-transmitting cover thickness |
| --- | --- | --- | --- |
| Embodiment | O | O | O |
| Comparative Example 1 | O | X | O |
| Comparative Example 2 | O | O | X |

In all of the display devices, an image was displayed on the non-display region (the non-display region 30 of the display device 100, the non-display region 630 of the display device 600, and the non-display region 730 of the display device 700), thus realizing jointless displaying across the entire screen. Since the display device 600 of Comparative Example 1 has a small image compression rate a (a<0.7), the black matrix was conspicuous, and also the decrease in resolution was large, thus resulting in poor display quality. On the other hand, in the display device 700 of Comparative Example 2, the light-transmitting covers have a greater thickness of 11 mm over the others, which does not provide for thinness or light-weightness of the display device. Such a display device is not preferable for being carried around, for example.

On the other hand, the display device 100 of the present embodiment has a good display quality because the image compression rate a can be increased. Moreover, in the display device 100 of the present embodiment, the lens portions have a large radius of curvature, but the light-transmitting covers are thin, because both front and rear faces are curved. Therefore, the display device 100 of the present embodiment is suitable for thinness and light-weightness. Such a display device is preferable for being carry around, for example.

Next, a construction for obtaining uniform displaying will be described. First, image uniformization will be described.

As a method of compressing an image, the present embodiment adopts a method where the pixel pitch is kept constant and a compressed image is created in the peripheral display regions 10D and 20D through signal processing. In other words, a display signal to be supplied to the pixels which are arrayed in the peripheral display regions 10D and 20D is uniformly compressed along the second direction (D2) with the image compression rate a. As a result, an image which is compressed by a factor of a along the second direction is created by the pixels which are arrayed in the peripheral display regions 10D and 20D. This method may be implemented in software, for example.

As a method of compressing images, there is a method of varying the pixel pitch along the second direction, for example, which makes the pixel pitch in the peripheral display region narrower than the pixel pitch in the central display region, thus creating a compressed image without performing signal processing. Although this method does not require any special signal processing, it is necessary to previously fabricate specially-designed display panels, thus resulting in problems such as poor versatility and cost. In the display device of the present embodiment, the pixels are arrayed at an equal interval across the entire display region, thus providing an advantage of a simple structure free of the aforementioned problems.

There is also a method where pixels are arrayed at an equal interval and a display signal is compressed at different compression ratios along the second direction to create a compressed image in the peripheral display region. In the display device of the present embodiment, the image compression rate a is kept constant as described above. Thus, the display device of the present embodiment also provides an advantage in that signal processing can be performed more easily because there is no need to vary the compression ratio of the display signal along the second direction.

Next, luminance uniformization will be described.

Within the light which goes out from the liquid crystal display panels 10 and 20, light entering the lens portions 141 and 241 is enlarged by the lens portions 141 and 241, and therefore has its luminance decreased in accordance with the enlargement rate (1/a) thereof. Therefore, a luminance difference occurs between the image which is displayed on the lens portions 141 and 241 and the image which is displayed on the flat plate portions 142 and 242.

Such a luminance difference can be improved by increasing the luminance of the light entering the lens portions 141 and 241 relative to the luminance of the light entering the flat plate portions 142 and 242.

In the liquid crystal display device 100 of the present embodiment, the following two methods are possible for increasing the luminance of the light going out from the central display regions 10B and 20B.

Method a: Decrease the transmittance of the pixels which are arrayed in the central display regions 10B and 20B.

Method b: Make the luminance of the light going out from the pixels which are arrayed in the peripheral display regions 10D and 20D higher than the luminance of the light going out from the pixels which are arrayed in the central display regions 10B and 20B.

Method a can be easily realized by adjusting the voltage which is supplied to the pixels. Method b can be realized by, for example, making the intensity of the light going out from the backlight devices 15 and 25 toward the pixels which are arrayed in the peripheral display regions 10D and 20D higher than the intensity of the light going out from the backlight devices 15 and 25 toward the pixels which are arrayed in the central display regions 10B and 20B. In the case where cold-cathode tubes are provided as the backlight devices 15 and 25, those cold-cathode tubes disposed corresponding to the peripheral display regions 10D and 20D may be activated so as to be brighter than the other cold-cathode tubes (cold-cathode tubes disposed corresponding to the central display regions 10B and 20B). A similar method can also be used in the case where light-emitting diodes (LEDs) are arranged side by side as backlight devices. It will be appreciated that the above Methods a and b may be combined to perform luminance uniformization.

In the case where the display panel is a self-light-emitting type display panel such as a plasma display panel (PDP) or an organic EL display panel (OLED), the luminance of those pixels which emit light entering the flat plate portions may be made relatively small.

The light-transmitting covers of the present embodiment may be fabricated by using an acrylic resin, for example. It will be appreciated that the material of the light-transmitting covers is not limited thereto. Any light-transmitting material, e.g., transparent resins such as polycarbonate or glass, can be used.

In the above description, a lens portion 141 or 241 disposed astride the boundary extending along the first direction between the display region 10A or 20A and the frame region 10F or 20F is provided on the light-transmitting cover 14 or 24 of the liquid crystal display device 100 of the present embodiment; however, the positions of the lens portions are not limited thereto. For example, a further lens portion (second lens portion) which is disposed astride a boundary (second boundary) extending along the second direction (D2) between the display region and the frame region may be provided for each light-transmitting cover. For example, in a display device having a rectangular display panel and a rectangular light-transmitting cover, if the light-transmitting cover further includes a second lens portion which is disposed astride the second boundary, it becomes possible to provide a lens portion in the frame region entirely around the display panel, thus being able to obscure the frame region entirely around the display panel. By adopting such a light-transmitting cover for each display device, when a plurality of display panels are used for tiling so as to adjoin each other along the first direction, for example, it becomes possible to display a jointless image, and realize a display device having a high display quality and being suitable for thinness and light-weightness.

In the above description, the liquid crystal display device 100 of the present embodiment includes two liquid crystal display panels 10 and 20. However, a display device according to the present invention may only have one display panel; for example, one display panel may be comprised, and one light-transmitting cover may be disposed on the viewer's side of the display panel. In such a display device, too, the frame region is obscured, and the display quality is high, thus being suitable for suitable for thinness and light-weightness. Moreover, a display device according to the present invention may have three or more display panels. For example, three or more display panels may be arrayed along the first direction, and a light-transmitting cover having a lens portion which is disposed astride a boundary extending along the second direction between the display region and the frame region may be disposed on the viewer's side of each display panel. Moreover, three or more display panels may be arrayed along the second direction, and a light-transmitting cover having a lens portion which is disposed astride a boundary extending along the first direction between the display region and the frame region may be disposed on the viewer's side of each display panel. Moreover, a plurality of display panels may be arrayed in a matrix so as to adjoin one another along the first direction and the second direction, and a light-transmitting cover having a lens portion which is disposed astride a boundary extending along the first direction between the display region and the frame region and a lens portion which is disposed astride a boundary extending along the second direction between the display region and the frame region may be disposed on the viewer's side of each display panel. In either case, a display device capable of displaying jointless images and having a high display quality and being suitable for thinness and light-weightness is realized.

Moreover, although the display panels of the present embodiment are liquid crystal display panels, a display panel according to the present invention is not limited to a liquid crystal display panel. As a display panel, a display panel for a PDP, an organic EL display panel, an electrophoresis display panel, and the like can be used, for example. Moreover, the present invention is also applicable to a self-light-emitting type display device which lacks a backlight.

Thus, according to embodiments of the present invention, there is realized a display device in which a frame region of a display panel is obscured, or which can display a jointless image in the case of being tiled up, and yet which has a high display quality and is suitable for thinness and light-weightness.

Next, with reference to FIG. 6 to FIG. 8, various specific examples of electronic devices in which display devices according to an embodiment of the present invention are used will be described.

The electronic device 200 shown in FIG. 6 includes two display sections 201 and 202 and a hinge 70. The display section 201 includes a display panel 210 and a light-transmitting cover 214, whereas the display section 202 includes a display panel 220 and a light-transmitting cover 224. The light-transmitting covers 214 and 224 are disposed on the viewer's side (an upper side in FIG. 6) of the display panels 210 and 220. The display section 202 is connected to the display section 201 via the hinge 70. The display panels 210 and 220 and the light-transmitting covers 214 and 224 have constructions similar to those of the display panels and light-transmitting covers, respectively, of the display device 100 of the present embodiment described earlier.

By the action of the hinge 70, the electronic device 200 is able to take an open state where the display section 201 and the display section 202 lie side by side as shown in FIG. 6(a), or a closed state where the display section 201 is in overlying relation with the display section 202 as shown in FIG. 6(b). In the open state (FIG. 6(a)), the lens portion 2141 of the light-transmitting cover 214 and the lens portion 2241 of the light-transmitting cover 224 lie side by side, so as to adjoin each other along the second direction (D2). As a result, the electronic device 200 is able to display a jointless image. On the other hand, in the closed state (FIG. 6(b)), the rear face of the display section 201 (the rear face side of the display panel 210) opposes the rear face of the display section 202 (the rear face side of the display panel 220); thus, the display section 201 and the display section 202 overlap so that the direction in which the display section 201 displays an image and the direction in which the display section 202 displays an image are opposite. In this closed state, the electronic device 200 can be carried around in a compact form.

In the aforementioned electronic device 200, the center of pivoting of the hinge 70 lies on a plane which is an extension of the rear face of the display section 201 and the rear face of the display section 202. However, the center of pivoting of the hinge 70 may lie on a plane which is an extension of the outermost viewer's side surfaces of the light-transmitting covers 214 and 224. FIG. 6(*c*) shows a schematic cross-sectional view of a closed state of an electronic device 200' in which a center of pivoting 75 of a hinge 70' lies on a plane which is an extension of the viewer-side surfaces of the light-transmitting covers 214 and 224. As shown in FIG. 6(*c*), in the closed state, the electronic device 200' is folded up with the light-transmitting covers 214 and 224 inside, so that the light-transmitting cover 214 side of the display section 201 and the light-transmitting cover 224 side of the display section 202 oppose each other. Although the electronic device 200' does not allow what is displayed on the display device to be visually recognized in the closed state, it is preferable in terms of being able to prevent scratching and soiling of the light-transmitting covers when being carried around.

Because both front and rear faces of the lens portions 2141 and 2241 are curved surfaces, the light-transmitting covers 214 and 224 of the electronic device 200 are thin, and the electronic device 200 has excellent portability. Moreover, even though the light-transmitting covers 214 and 224 are thin, images which are displayed by the electronic device 200 have a high display quality.

The electronic device 300 shown in FIG. 7 includes two display sections 301 and 302. The display section 301 includes a display panel 310, whereas the display section 302 includes a display panel 320 and a light-transmitting cover 324. The light-transmitting cover 324 is disposed on the viewer's side (an upper side in FIG. 7) of the display panel 320. The display panels 310 and 320 and the light-transmitting cover 324 have constructions similar to those of the display panels and light-transmitting covers, respectively, of the aforementioned liquid crystal display device 100 of the present embodiment. The display section 302 is disposed on the viewer's side of the display section 301. Moreover, the display section 302 is constructed so as to slide along the second direction on the display section 301.

The display section 302 is retained so as to be capable of sliding between a position at which it adjoins the display section 301 along the second direction (D2) (FIG. 7(*a*)) and a position at which it overlies the display section 301 (FIG. 7(*b*)), as seen from the viewer's side. When the display section 302 is at the position where it adjoins the display section 301 along the second direction D2 as shown in FIG. 7(*a*), a lens portion 3241 of light-transmitting cover 324 overlaps a frame region 310F of display section 301. Therefore, the frame region 310F is not visually recognized. Moreover, as shown in FIG. 7(*a*), the lens portion 3241 refracts light which goes out from the pixels within the peripheral display regions of the display panel 320. As a result, an image is displayed on the lens portion 3241. Therefore, the electronic device 300 is able to display a jointless image. On the other hand, when the display section 302 is at the position where it overlies the display section 301 (FIG. 7(*b*)), the rear face of the display panel 320 of the display section 302 overlies the display plane 319 of the display panel 310. In this state, the electronic device 300 can be carried around in a compact form.

Because both front and rear faces of the lens portion 3241 are curved surfaces, the light-transmitting cover 324 of the display section 302 of the electronic device 300 is thin, and the electronic device 300 has excellent portability. Moreover, even though the light-transmitting cover is thin, images which are displayed by the electronic device 300 have a high display quality.

An electronic device 400 shown in FIG. 8 includes three display sections 401, 402, and 403. The display section 401 includes a display panel 410; the display section 402 includes a display panel 420 and a light-transmitting cover 424; and the display section 403 includes a display panel 430 and a light-transmitting cover 434. The light-transmitting cover 424 is disposed on the viewer's side (an upper side in FIG. 8) of the display panel 420, whereas the light-transmitting cover 434 is disposed on the viewer's side of the display panel 430. The display panels 410, 420, and 430 and the light-transmitting covers 424 and 434 have constructions similar to those of the display panel and light-transmitting covers, respectively, of the aforementioned display device 100 of the present embodiment. The display section 402 is disposed on the viewer's side of the display section 401, whereas the display section 403 is disposed on the viewer's side of the display section 402.

The display sections 401 and 402 are display sections having similar constructions to those of the display sections 301 and 302 of the electronic device 300 shown in FIG. 7, respectively. Similarly to the display section 302 of the electronic device 300, the display section 402 is retained so as to be capable of sliding along the second direction (D2) on the display section 401. In other words, the electronic device 400 is constructed so as to include a further display section on the viewer's side of an electronic device having a similar construction to that of the electronic device 300. Similarly to the display section 302 of the electronic device 300, the display section 403 is retained so as to be capable of sliding along the second direction D2 on the display section 402.

As seen from the viewer's side, the display section 403 is capable of sliding between a position at which it adjoins the display section 402 along the second direction (FIG. 8(*a*)) and a position at which it overlies the display section 402 (FIG. 8(*b*)). As shown in FIG. 8(*a*), when the display section 403 is at the position at which it adjoins the display section 402 and the display section 402 adjoins the display section 401, a lens portion 4341 of the light-transmitting cover 434 overlaps a frame region 420F of the display panel 420, and a lens portion 4241 of the light-transmitting cover 424 overlaps a frame region 410F of the display panel 410. At this time, similarly to the aforementioned electronic device 300 (FIG. 7), the frame regions 410F and 420F are not visually recognized. Moreover, an image is displayed on the lens portions 4241 and 4341. As a result, the electronic device 400 is able to display a jointless image across its entirety. On the other hand, when the display section 403 is at the position where it overlies the display section 402 and the display section 402 overlies the display section 401, as shown in FIG. 8(*b*), the rear face of the display panel 420 of the display section 402 overlies the display plane 419 of the display panel 410, and the rear face of the display panel 430 of the display section 403 overlies the light-transmitting cover 424 of the display section 402. In this state, the electronic device 400 can be carried around in a compact form.

Because both front and rear faces are curved surfaces, the light-transmitting covers 424 and 434 of the electronic device 400 are thin, thus providing for excellent portability. Even though the light-transmitting covers are thin, images which are displayed by the electronic device 400 have a high display quality.

For a slide-type electronic device such as the electronic device 400, at least one display section having a similar construction to that of the display section 403 may be further provided on the viewer's side of the display section 403 of the electronic device 400. Even in such an electronic device, so long as the further display section has the aforementioned sliding construction, a jointless and high-display-quality image can be displayed when the display sections lie side by side so as to adjoin each other, and it can be carried around in a compact form when the display sections overlie one another. Thus, by stacking multiple display panels, it becomes possible to realize a display device or electronic device having a large screen and improved portability.

The light-transmitting cover according to the present invention can be suitably used in the case of being carried around, as in the electronic devices 200, 300, and 400 above.

Figure 9:
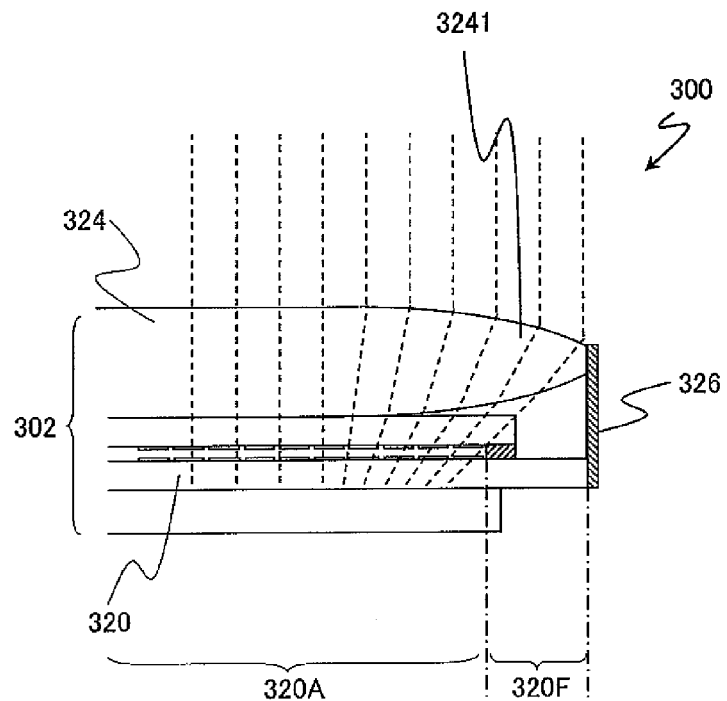
FIG. 9 A diagram showing a portion of the display section 302 of the electronic device 300 enlarged.

As for the electronic device 200 (FIG. 6), in the closed state (FIG. 6(b)), end faces of the lens portions 2141 and 2241 of the light-transmitting covers 214 and 224 of the display sections 201 and 202 closer to the frame regions are exposed. As for the electronic device 300 (FIG. 7), in both the case where the display sections 301 and 302 lie side by side (FIG. 7(a)) and the case where the display section 301 and the display section 302 overlie each other (FIG. 7(b)), the end face of the lens portion 3241 of the light-transmitting cover 324 is exposed. Similarly in the electronic device 400 (FIG. 8), the end faces of the lens portions 4241 and 4341 of the display sections 402 and 403 are exposed. In the case where the end face of the lens portion of a light-transmitting cover closer to the frame region is exposed in use, as in the electronic devices 200, 300, and 400, it is preferable to provide a protection member at the end face of the lens portion for protection, in order to prevent chipping and scratching of the end face of the lens portion and prevent dust and the like from mixing into the display device. FIG. 9 shows enlarged the neighborhood of an end face, closer to a frame region 320F, of the display section 302 of the electronic device 300 according to the present invention. As shown in FIG. 9, in the electronic device 300, a protection member 326 is provided at the end face of the lens portion 3241 of the light-transmitting cover 324. Similarly, it is preferable to provide protection members 216 and 226, respectively, on the end face of lens portion 2141 of the display section 201 and on the end face of the lens portion 2241 of the display section 202 of the electronic device 200 (FIG. 6), and it is preferable to provide protection members 426 and 436, respectively, on the end face of the lens portion 4241 of the display section 402 of the electronic device 400 and the end face of the lens portion 4341 of the display section 403 (FIG. 8).

In order not to disturb the continuity of the displayed image, it is desirable that the protection members are sufficiently thin, and adhesion films or the like are suitably used, for example.

Using a protection member with a high optical absorption rate (e.g., 95% or more) is preferable because it is able to absorb unnecessary light which is transmitted through the light-transmitting cover, thus improving the display quality. As a protection member with a high optical absorption rate, a protection member in black color or the like may be used, for example.

Moreover, in the display device of the present embodiment, in order to suppress reflection of ambient light at the viewer-side surface of a light-transmitting cover, the viewer-side surface may be subjected to an antireflection treatment. As the antireflection treatment, a layer having a lower refractive index than that of the light-transmitting cover may be provided on the viewer-side surface.

Figure 10:
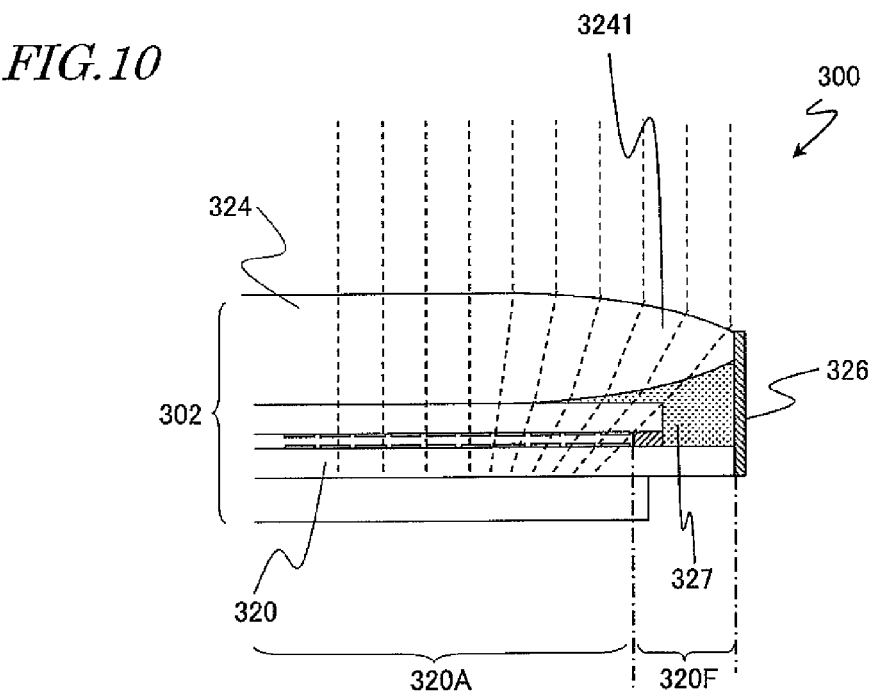
FIG. 10 A diagram showing a portion of the display section 302 of the electronic device 300 enlarged.

Moreover, in order to suppress reflection of ambient light, a light-transmitting cover and the display plane of a display panel may be adhesively bonded with a resin having a lower refractive index than that of the light-transmitting cover. FIG. 10 shows enlarged a portion of the display section 302 of the electronic device 300 according to the present invention. As shown in FIG. 10, the light-transmitting cover 324 is adhesively bonded to the display panel 320 via resin 327. The resin 327 has a lower refractive index than that of the light-transmitting cover 324. In this case, if the adhesive bonding were conducted with a resin having a closer refractive index to the refractive index of the light-transmitting cover, the light going out from the display panel would not be refracted at the rear-side surface of the lens portion, and thus the lens function would be lost. Use of a resin having a lower refractive index than that of the light-transmitting cover is preferable because the light going out from the display panel will be refracted at the rear-side surface of the lens portion. Preferably, the difference between the refractive index of the resin used for the adhesive bond and the refractive index of the light-transmitting cover is 0.05 or more. As the resin 327, Opster (refractive index: 1.36 to 1.42) manufactured by JSR Corporation is used, for example.

As described above, according to the present invention, there is provided a display device which, with a simpler structure than conventionally, obscures a frame region of a display panel, or displays a jointless image in the case of being tiled with a plurality of display panels, such that its black matrix is not conspicuous at the front face the frame region and any non-display region, and which can realize displaying with a high display quality and a reduced decrease in resolution, with a thin light-transmitting cover. Therefore, according to the present invention, a display device which is suitable for thinness and light-weightness is realized. Moreover, a display device according to the present invention is applicable to a display device which realizes a large screen through a matrix connection, and is also suitably applicable to a compact electronic device to be carried around for use.

INDUSTRIAL APPLICABILITY

The present invention is suitably used as a television set or as a display device for displaying information.

| REFERENCE SIGNS LIST | |
| --- | --- |
| 10, 20 | liquid crystal display panel |
| 10A, 20A | display region |
| 10B, 20B | central display region |
| 10D, 20D | peripheral display region |
| 10F, 20F | frame region |
| 11, 21 | upper substrate |
| 12, 22 | lower substrate |
| 13, 23 | liquid crystal layer |
| 14, 24 | light-transmitting cover |
| 15, 25 | backlight device |
| 16, 26 | sealing portion |
| 19, 29 | display plane of display panel |
| 30 | non-display region |
| 70 | hinge |
| 75 | center of pivoting |
| 100 | liquid crystal display device |
| 141, 241 | lens portion |
| 142, 242 | flat plate portion |
| 1411, 2411 | viewer-side surface of lens portion |
| 1412, 2412 | rear-side surface of lens portion |
| 1421, 2421 | viewer-side surface of flat plate portion |
| 2413 | first line of intersection |
| 2414 | second line of intersection |
| B1 | border line between liquid crystal display panel 10 and liquid crystal display panel 20 |
| D1 | first direction |
| D2 | second direction |

The invention claimed is:

1. A direct-viewing type display device comprising:
at least one display panel having a display region and a frame region provided outside the display region, with a boundary extending along a first direction between the display region and the frame region; and
at least one light-transmitting cover disposed on a viewer's side of the at least one display panel, wherein,
the at least one light-transmitting cover includes a lens portion disposed astride the boundary for refracting a portion of light going out from the display region toward the frame region;
a viewer-side surface of the lens portion is a convex curved surface, and a rear-side surface of the lens portion is also a convex curved surface; and
the viewer-side surface of the lens portion and the rear-side surface of the lens portion are symmetric in shape with respect to a plane that is located between and at a center of the viewer-side surface and the rear-side surface.

2. The direct-viewing type display device of claim 1, wherein at least one of a first line of intersection and a second line of intersection is a circular arc, the first line of intersection being a line of intersection between the viewer-side surface of the lens portion and a plane which is perpendicular to the boundary, and the second line of intersection being a line of intersection between the rear-side surface of the lens portion and the plane which is perpendicular to the boundary.

3. The direct-viewing type display device of claim 1, wherein at least one of a first line of intersection and a second line of intersection is a curve other than a circular arc, the first line of intersection being a line of intersection between the viewer-side surface of the lens portion and a plane which is perpendicular to the boundary, and the second line of intersection being a line of intersection between the rear-side surface of the lens portion and the plane which is perpendicular to the boundary.

4. The direct-viewing type display device of claim 1, wherein both of the viewer-side surface of the lens portion and the rear-side surface of the lens portion are convex, free curved surfaces.

5. The direct-viewing type display device of claim 1, wherein the at least one light-transmitting cover includes, in a portion other than the lens portion, a flat plate portion whose viewer-side surface is composed of a face which is substantially parallel to a display plane of the at least one display panel.

6. The direct-viewing type display device of claim 5, wherein, in the display region, a plurality of pixels are arrayed at an equal interval along the first direction and along a second direction which is perpendicular to the first direction.

7. The direct-viewing type display device of claim 6, wherein a display signal supplied to a pixel emitting light entering the lens portion is compressed along the second direction relative to a display signal supplied to a pixel emitting light entering the flat plate portion.

8. The direct-viewing type display device of claim 6, wherein
a display signal supplied to a pixel emitting light entering the lens portion is uniformly compressed along the second direction at a compression rate a (0<a<1) relative to a display signal supplied to a pixel emitting light entering the flat plate portion; and
the compression rate a is defined by an equation $a = L1/(L1+L2)$, where L1 is a width of a peripheral display region along the second direction, the peripheral display region being a region of the display region in which pixels emitting light entering the lens portion are arrayed; and L2 is a width of the frame region along the second direction.

9. The direct-viewing type display device of claim 8, wherein the lens portion enlarges an image created in the peripheral display region uniformly by a factor of 1/a along the second direction.

10. The direct-viewing type display device of claim 8, wherein the compression rate a is 0.7 or more.

11. The direct-viewing type display device of claim 8, wherein a luminance of an image created in the peripheral display region is higher than a luminance of an image created in a region of the display region other than the peripheral display region.

12. The direct-viewing type display device of claim 8, further comprising a backlight device for emitting light toward the at least one display panel, wherein
an intensity of light emitted from the backlight device toward pixels arrayed in the peripheral display region is higher than an intensity of light emitted from the backlight device toward pixels arrayed in a region of the display region other than the peripheral display region.

13. The direct-viewing type display device of claim 1, wherein a protection member is provided at an end of the lens portion closer to the frame region.

14. The direct-viewing type display device of claim 13, wherein the protection member is an adhesion film.

15. The direct-viewing type display device of claim 13, wherein the protection member has an optical absorption rate of 95% or more.

16. The direct-viewing type display device of claim 13, wherein the protection member is black in color.

17. The direct-viewing type display device of claim 1, wherein a viewer's side of the at least one light-transmitting cover is antireflection-treated.

18. The direct-viewing type display device of claim 1, wherein a layer having a lower refractive index than that of the at least one light-transmitting cover is provided on a viewer's side of the at least one light-transmitting cover.

19. The direct-viewing type display device of claim 1, wherein the at least one light-transmitting cover is adhesively bonded to the at least one display panel with a resin having a lower refractive index than that of the at least one light-transmitting cover.

20. The direct-viewing type display device of claim 1, wherein
an additional boundary extends along a second direction between the display region and the frame region, the second direction being perpendicular to the first direction; and
the at least one light-transmitting cover includes an additional lens portion disposed astride the additional boundary.

21. The direct-viewing type display device of claim 20, wherein
the at least one display panel includes two or more display panels arrayed so as to adjoin each other along the first direction or a second direction which is perpendicular to the first direction;
the at least one light-transmitting cover includes two or more light-transmitting covers arrayed so as to adjoin each other along the first direction or the second direction; and
lens portions of the two or more light-transmitting covers adjoin each other along the first direction or the second direction.

22. An electronic device comprising a first display section, a hinge, and a second display section connected to the first display section via the hinge, wherein
the first display section and the second display section are the direct-viewing type display devices of claim 1; and
the hinge allows the electronic device to take: an open state in which the first display section and the second display section lie side by side so that the lens portion of the first display section and the lens portion of the second display section adjoin each other; or a closed state in which the first display section is in overlying relation with the second display section.

23. An electronic device comprising:
a first display section having a display region and a frame region provided outside the display region; and
a second display section having the direct-viewing type display device of claim 1 and being disposed on a viewer's side of the first display section, wherein
the second display section is retained by the first display section so that, as seen from the viewer's side, the second display section is capable of sliding between: a position at which the second display section overlies the first display section; and a position at which the second display section and the first display section adjoin each other and the lens portion of the second display section overlaps the frame region of the first display section.

24. The electronic device of claim 23, comprising a third display section having a direct-viewing type display device including at least one display panel having a display region and a frame region provided outside the display region, with a boundary extending along a first direction between the display region and the frame region, and at least one light-transmitting cover disposed on a viewer's side of the at least one display panel, wherein the at least one light-transmitting cover includes a lens portion disposed astride the boundary for refracting a portion of light going out from the display region toward the frame region, and a viewer-side surface of the lens portion is a curved surface, and a rear-side surface of the lens portion is also a curved surface, the direct-viewing type display device being disposed on a viewer's side of the second display section, and wherein
the third display section is retained by the second display section so that, as seen from the viewer's side, the third display section is capable of sliding between: a position at which the third display section overlies the second display section; and a position at which the third display section and the second display section adjoin each other and the lens portion of the third display section overlaps the frame region of the second display section.

\* \* \* \* \*